March 29, 1955  V. W. PETERSON ET AL  2,704,996
FLUID OPERATED CYLINDER WITH ADJUSTABLE CUSHION
Filed July 17, 1952  2 Sheets-Sheet 2
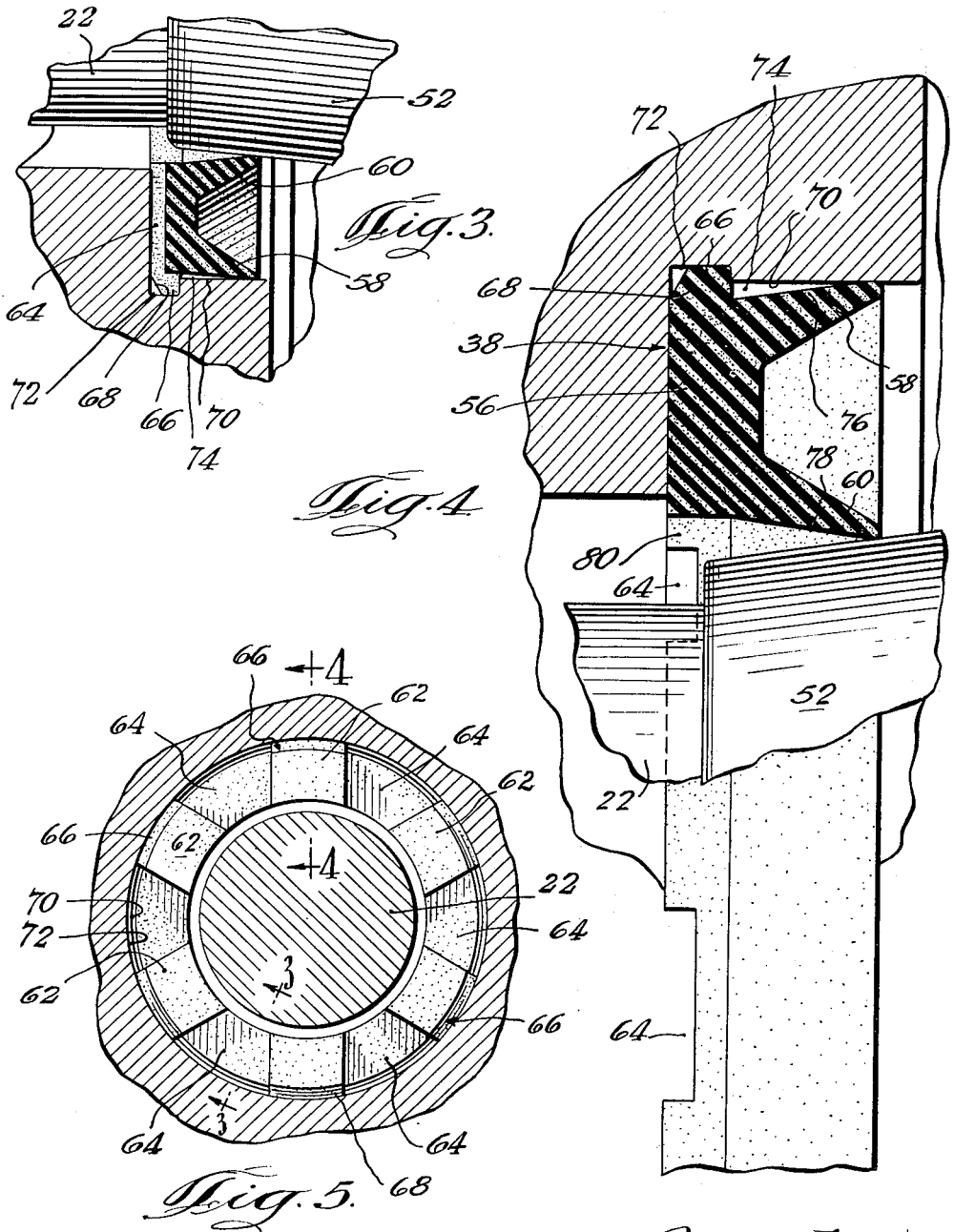
Inventors
Victor W. Peterson
Otto J. Maka
By Mann, Brown & Hausmann
Attorneys

United States Patent Office 2,704,996
Patented Mar. 29, 1955

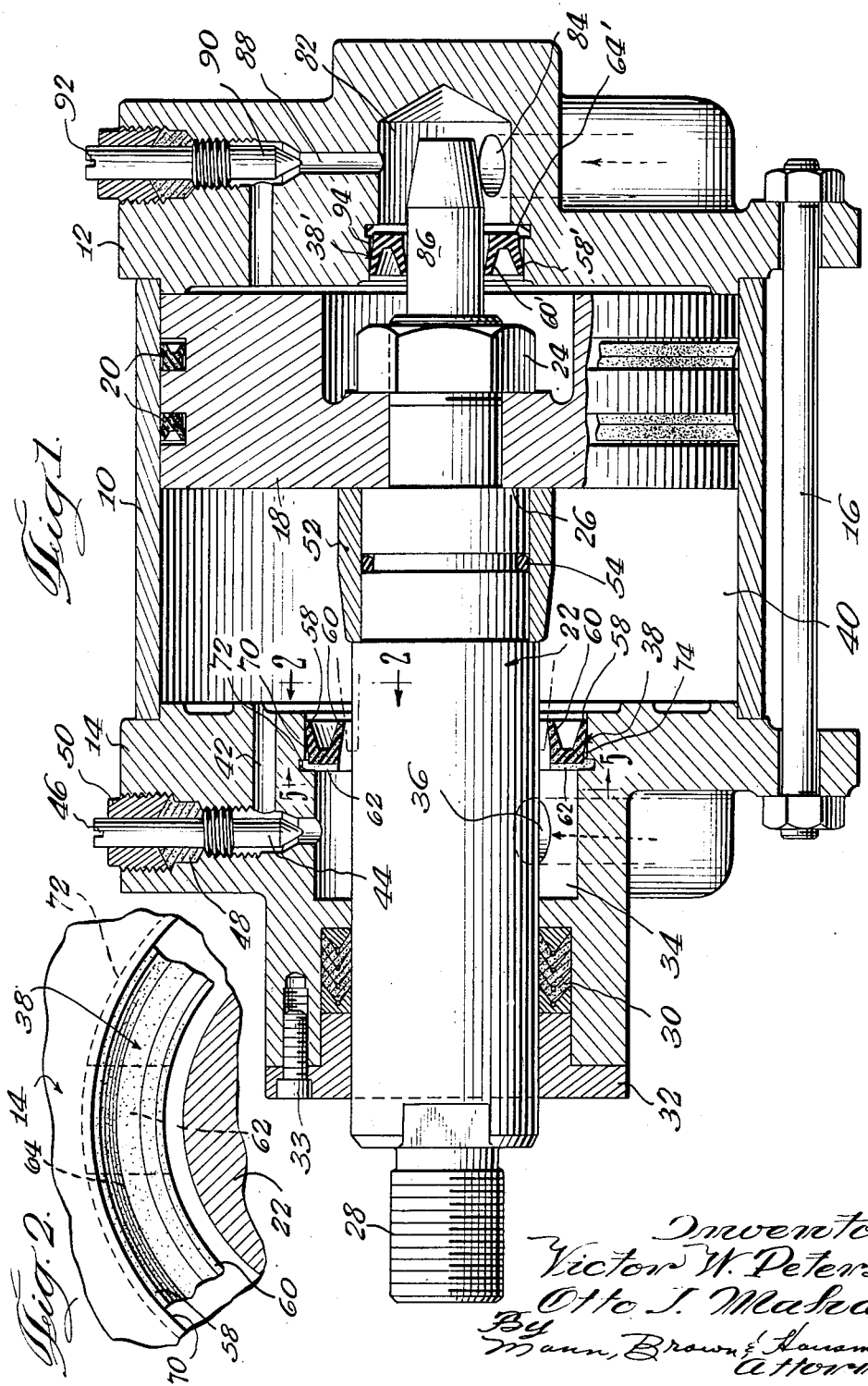

2,704,996

FLUID OPERATED CYLINDER WITH ADJUSTABLE CUSHION

Victor W. Peterson, La Porte, Ind., and Otto J. Maha, Chicago, Ill., assignors to Hannifin Corporation, Chicago, Ill., a corporation of Illinois Application July 17, 1952, Serial No. 299,486

5 Claims. (Cl. 121—38)

Our invention relates to fluid operated cylinders with adjustable cushions and is applicable both to pneumatic and hydraulic cylinders.

Fluid operated cylinders in which either one or both ends of the cylinder are provided with adjustable cushions are extensively used for a wide variety of industrial purposes. Among the objects of our invention are: to simplify and improve the construction of such cylinders, reduce their cost of manufacture, improve their operation, increase their life, and provide a new and improved seal and check valve for such cylinders.

Other objects and advantages will become apparent as the description proceeds in connection with the accompanying drawings, in which:

Fig. 1 is a longitudinal sectional view through a pneumatic cylinder incorporating our invention;

Fig. 2 is an enlarged fragmentary transverse sectional view taken on the line 2—2 of Fig. 1;

Fig. 3 is an enlarged fragmentary longitudinal sectional view taken on the line 3—3 of Fig. 5, showing our novel seal and check valve and associated parts;

Fig. 4 is a view similar to Fig. 3 but on a still larger scale and taken on the line 4—4 of Fig. 5; and Fig. 5 is a partial transverse sectional view taken on the line 5—5 of Fig. 1.

The pneumatic cylinder shown in Fig. 1 of the drawings is a double-acting cylinder having an adjustable air cushion at each end. This cylinder comprises a body 10 having caps 12 and 14 secured thereto by the tie rods 16. A piston 18 is located in the body 10 and may be provided with suitable packing rings 20.

The piston 18 is attached to a piston rod 22 by means of a nut 24 which clamps the central portion of the piston against a shoulder 26 provided by the piston rod. The piston rod extends through the cap 14 and has a threaded end 28 which may be attached to any mechanism to be operated by the cylinder. The gland packing 30 effects a seal between the piston rod 22 and cap 14 and is held in place by a packing gland 32 attached by screws 33 to the cap 14.

The cap 14 is provided with a chamber 34 surrounding a portion of the piston rod 22 and having a combined inlet and outlet port 36. A combined seal and check valve is indicated generally by reference character 38, and is located between the chamber 34 and the cylinder bore 40. When the piston and piston rod are in the position shown in Fig. 1 there is free communication between the chamber 34 and adjacent end of the cylinder bore by way of the annular space between the piston rod and valve 38.

A bypass 42 also connects the chamber 34 with the adjacent end of the cylinder bore 40. The effective cross-section of this bypass may be varied by a needle or metering valve 44 threaded into the cap 14 and having a kerf 46 for receiving a screwdriver or similar tool. A packing 48 forms a seal between the needle valve 44 and cap 14 and this packing is compressed by a tubular nut 50.

When the piston 18 has moved a substantial distance toward the left as viewed in Fig. 1, the cushion sleeve 52 engages and forms a seal with the combined seal and check valve 38. This is indicated by the dotted lines in Fig. 1 showing different positions of this sleeve, and is shown more clearly in the enlarged views of Figs. 3 and 4. An O-ring 54 of natural or synthetic rubber, or other suitable material, is provided to prevent leakage of air axially of the cylinder between the cushion sleeve 52 and the adjacent portion of the piston rod.

Referring particularly to Figs. 3, 4, and 5, it will be seen that the seal and check valve 38 is in the form of a unitary annulus composed entirely of homogeneous synthetic rubber or other suitable material. This seal and check valve has a relatively heavy base 56 forming a support for the flexible lips 58 and 60. The opposite side of the base 56 is provided with lugs 62 separated by spaces 64. In the particular embodiment shown the base is provided with six lugs separated by an equal number of spaces, although it will be understood that the number of lugs and spaces may be varied as desired. The lugs 62 are provided with laterally extending flanges 66 having beveled rear edges 68 for a purpose hereinafter described.

Our novel unitary seal and check valve is located in a counterbore 70 which merges with an annular groove 72 for receiving the flanges 66. By virtue of the deformable nature of the material of which the unitary seal and check valve is composed, the flanges 66 may be readily inserted in the groove 72 and serve securely to hold the seal and check valve against displacement from the counterbore 70. The spaces 64 constitute passages which are at all times in free communication with the chamber 34 and the radially outermost ends of the passages or spaces 64 are in communication with each other by virtue of the circumferential passage 74. This construction provides free communication at all times between the chamber 34 and the outer face 76 of the lip 58. The outer face 78 of the inner lip 60 is also always in free communication with the chamber 34 by way of the annular space 80.

When the parts are in the position shown in full lines in the several figures, the outer lip 58 of our unitary seal and check valve lightly engages the wall of the counterbore 70. The flexibility of this lip compensates for slight variations in dimensions of the sealing ring itself, the counterbore 70, and any slight eccentricity of the collar 52 therein, so that it is not essential to make any of these parts to a high degree of dimensional accuracy. When the piston is moved to the left as viewed in Fig. 1, the collar 52 engages the inner lip 60 as indicated more clearly in Figs. 3 and 4, and here again the flexibility of this lip compensates for slight differences in size and centering of the collar relative to the sealing ring.

The cap 12 is also provided with a chamber 82 having a combined inlet and exhaust port 84. A unitary seal and check valve 38' is interposed between the chamber 82 and the adjacent end of the cylinder bore 40. This seal and check valve 38' is illustrated as being identical, except for size, with the unitary seal and check valve 38. In the position of the parts shown in Fig. 1, the piston rod extension or spear 86 engages the inner lip of the unitary seal and check valve 38' and prevents flow of fluid from the adjacent end of cylinder bore 40 into chamber 82.

A bypass 88 connects the chamber 82 with the adjacent end of the cylinder bore 40 and this bypass has a needle valve 90 which may be adjusted by inserting a screwdriver in the kerf 92 to give any desired metered flow through the bypass. While it is common and generally desirable to provide the bypasses 42 and 88 with adjustable needle valves, this is not essential to our invention, and fixed bypasses may be used in lieu of the adjustable bypasses shown.

It will be understood that the admission and discharge of air or other fluid through the ports 36 and 84 is controlled by suitable valve means (not shown) whereby these ports may be alternately connected with a source of fluid under pressure. Such valve means may be operated either manually or by power and by either direct or remote control, as desired, and form no part of our present invention.

With the parts in the position shown in Fig. 1, the control valve is operated to connect port 84 with a source of fluid under pressure, and to connect port 36 with atmosphere or a chamber into which the operating fluid may be discharged. Fluid entering port 84 fills chamber 82, and a small amount of this fluid flows through bypass 88 into the right-hand end of cylinder bore 40. The small amount of fluid flowing through bypass 88 however is insufficient to give a quick action to the piston 18. The great bulk of the fluid entering chamber 82 flows past the unitary seal and check valve 38' and into the right-hand end of the cylinder bore. In so doing, the fluid presses inwardly the lips 58' and 60'. These lips are normally in light sealing engagement with the counterbore 94 and spear 86 respectively, and yield readily to permit free flow of fluid therepast. Approximately half of the air flowing past the unitary seal and check valve 38' flows through the radial passages 64' and past outer lip 58'. The other half flows between lip 60' and spear 86.

This free flow of fluid into the right-hand end of the cylinder bore results in the movement toward the left as viewed in Fig. 1. During the first part of this piston movement, the fluid in the cylinder bore to the left of the piston can flow freely between the piston rod 22 and the unitary seal and check valve 38 to the exhaust port 36. This condition prevails until the collar 52 engages the inner lip 60 of the sealing means, as shown in Figs. 3 and 4, and indicated in dotted lines in Fig. 1. This traps the remaining fluid in the left-hand end of the cylinder bore, and the only escape for such fluid is through the bypass 42, which is adjusted to give the desired cushioning effect.

This same leftward movement of piston 18 causes the spear 86 to move out of the unitary seal and check valve 38'. Thereupon, wide open communication is established between the chamber 82 and the right-hand end of the cylinder bore, and lips 58' and 60' of the sealing means return to their normal positions.

On the return stroke of the piston, fluid entering chamber 34 from inlet port 36 forces inwardly the outer lip 58 and forces outwardly the inner lip 60 of the unitary seal and check valve 38 to flow freely into the left-hand end of the cylinder and initiate instantly a return movement of the piston 18. Again, a slight amount of fluid enters the left-hand end of the cylinder bore 40 through bypass 42. We have found it advisable to give the passages 62 a total cross-sectional area equal to at least half of the total area of the port 36. The corresponding passages of the unitary seal and check valve 38' are also made of this same size.

The cost of manufacture of a fluid operated cylinder with adjustable cushion embodying our invention is materially decreased due to the fact that the flexible seal and check valve compensates for slight variations in size of the parts and slight variations in eccentricity of one part with respect to another, thereby eliminating the need for close and expensive tolerances in making the individual parts. This construction also compensates for wear and thereby increases the useful life of the cylinder structure and reduces servicing requirements. Furthermore, two separate and distinct passages are provided past the combined sealing means and check valve whereby fluid entering through the inlet port may flow freely into the adjacent end of the cylinder bore with resulting prompt and fast movement of the piston in the desired direction.

Also, a flexible lip of the unitary seal and check valve coacts either with the cushioned collar on the piston rod or the spear-like extension thereof to give an immediate cutting off of direct communication between the adjacent end of the cylinder bore and its discharge port regardless of whether the fluid used is gas or liquid. Thereafter the sole communication between such end of the cylinder bore and its discharge port is by way of the needle valve control bypass which may be accurately adjusted to give the desired cushioning effect. The accuracy of this cushioning adjustment is enhanced by virtue of the fact that the particular sealing means utilized is not affected by small particles of dirt or other impurities in the operating fluid.

Our novel seal and check valve combines in a single unitary structure those characteristics which contribute to all of the foregoing advantages. This unitary structure may be readily and inexpensively molded by conventional methods and may be easily and quickly assembled in a cylinder structure or disassembled for inspection or replacement.

In cushioned cylinders it is usual to provide each end of the cylinder with a second bypass having a check valve opening toward the cylinder bore to permit rapid ingress of fluid to such port. Another advantage of our invention is the elimination of the second bypass and its check valve while retaining all of the benefits thereof.

It is to be understood that our invention is not limited to the details shown and described but may assume numerous other forms and includes all modifications, variations, and equivalents coming within the scope of the appended claims.

We claim:

1. In a fluid operated cylinder of the class described, the combination of a body providing a cylinder bore, means providing a chamber communicating with said bore, an inlet and outlet port for said chamber, a piston reciprocable in said cylinder bore, a part movable with said piston, a counterbore between said chamber and cylinder bore, an annular groove merging with said counterbore, and a means mounted in said counterbore and cooperating with said part to function as a combined seal and check valve to cut off fluid flow from said cylinder bore to said chamber while permitting fluid flow from said chamber to said cylinder bore, said last-named means comprising a unitary annulus composed entirely of homogeneous and flexible material and including a base having a pair of flexible lips projecting therefrom for sealing with said counterbore and part respectively, and a flange projecting into said groove to retain said last-named means in said counterbore, said base having radial passages providing substantially equal fluid flow past both of said lips.

2. A fluid cylinder of the class described including a part having a cylinder bore, means providing a chamber opening into said cylinder bore, inlet and outlet port means for said chamber, a piston reciprocable in said bore, a part reciprocable with said piston, means fixed to one of said parts for cutting off fluid flow from said bore to said chamber when said piston reaches a predetermined position in said bore, said last-named means including an annular base having inner and outer collapsible lips for controlling fluid flow between said chamber and said cylinder bore, said base having a flange for attaching said last-named means to one of said parts, said lips, base, and flange being of unitary construction and homogeneous material, and a restricted bypass connecting said bore and chamber.

3. A fluid cylinder of the class described including a part having a cylinder bore, means providing a chamber opening into said cylinder bore, inlet and outlet port means for said chamber, a piston reciprocable in said bore, a part reciprocable with said piston, means fixed to one of said parts for cutting off fluid flow from said bore to said chamber when said piston reaches a predetermined position in said bore, said last-named means including an annular base having outwardly projecting flanges for securing said base to one of said parts, said base having a pair of collapsible lips for controlling fluid flow from said chamber to said cylinder bore, said lips, base, and flanges being of homogeneous unitary construction and said base having radially arranged fluid passages therein, and a restricted bypass connecting said bore and chamber.

4. In a fluid operated cylinder of the class described having a part providing a cylinder bore, means providing a chamber opening into said cylinder bore, inlet and outlet port means for said chamber, a piston reciprocable in said bore, a part reciprocable with said piston, and a restricted bypass connecting said bore and chamber, the combination therewith of a combined seal and check valve for controlling flow between said cylinder bore and chamber comprising an annular base, securing means integral therewith, a pair of flexible sealing lips projecting from one side of said base and radially arranged fluid passages in the opposite side of said base.

5. A combined seal and check valve for a piston and cylinder structure having an adjustable cushion, said combined seal and check valve comprising an annular base having thicker sections provided with outwardly projecting radial flanges for attaching the seal and check valve to the piston and cylinder structure, inner and outer annular lips projecting from one side of said base and adapted to seal against fluid flow toward said base but permit fluid flow from said base toward said lips, the thinner sections of said base providing radially extending fluid passages on a side of said base opposite said lips, said combined seal and check valve being formed as a unitary structure of homogeneous synthetic rubber.

References Cited in the file of this patent

UNITED STATES PATENTS

| | | |
|---|---|---|
| 2,102,834 | Carroll | Dec. 21, 1937 |
| 2,493,602 | Sterrett | Jan. 3, 1950 |

FOREIGN PATENTS

| | | |
|---|---|---|
| 623,478 | Great Britain | May 18, 1949 |
| 635,950 | Great Britain | Apr. 19, 1950 |